April 21, 1942.　　E. W. DAMBACH, JR　　2,280,221
SERVING APPARATUS
Filed Nov. 29, 1940　　5 Sheets-Sheet 1
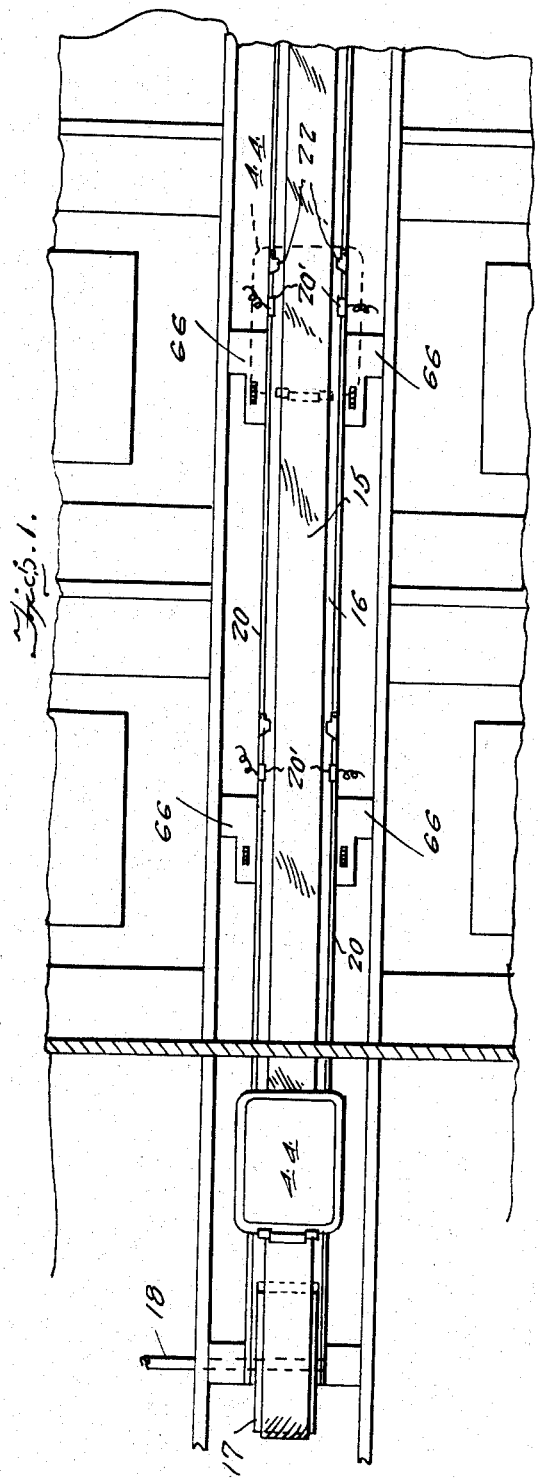
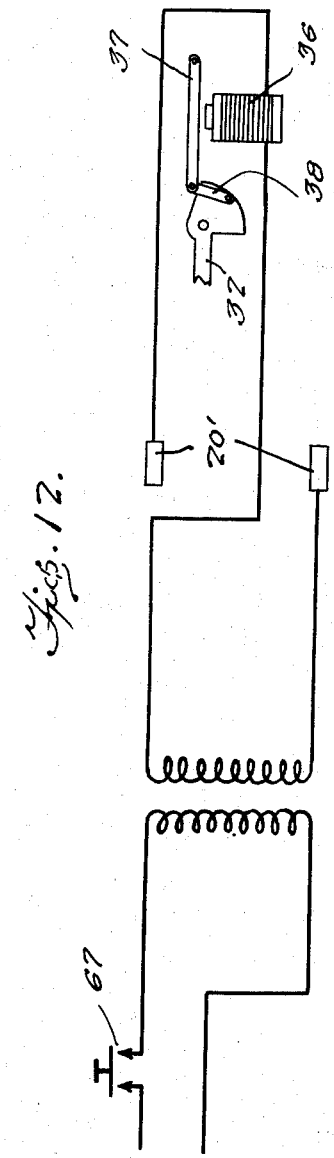
Inventor
Emil William Dambach Jr.
By Clarence A. O'Brien
Attorney April 21, 1942.  E. W. DAMBACH, JR  2,280,221
SERVING APPARATUS
Filed Nov. 29, 1940  5 Sheets-Sheet 2
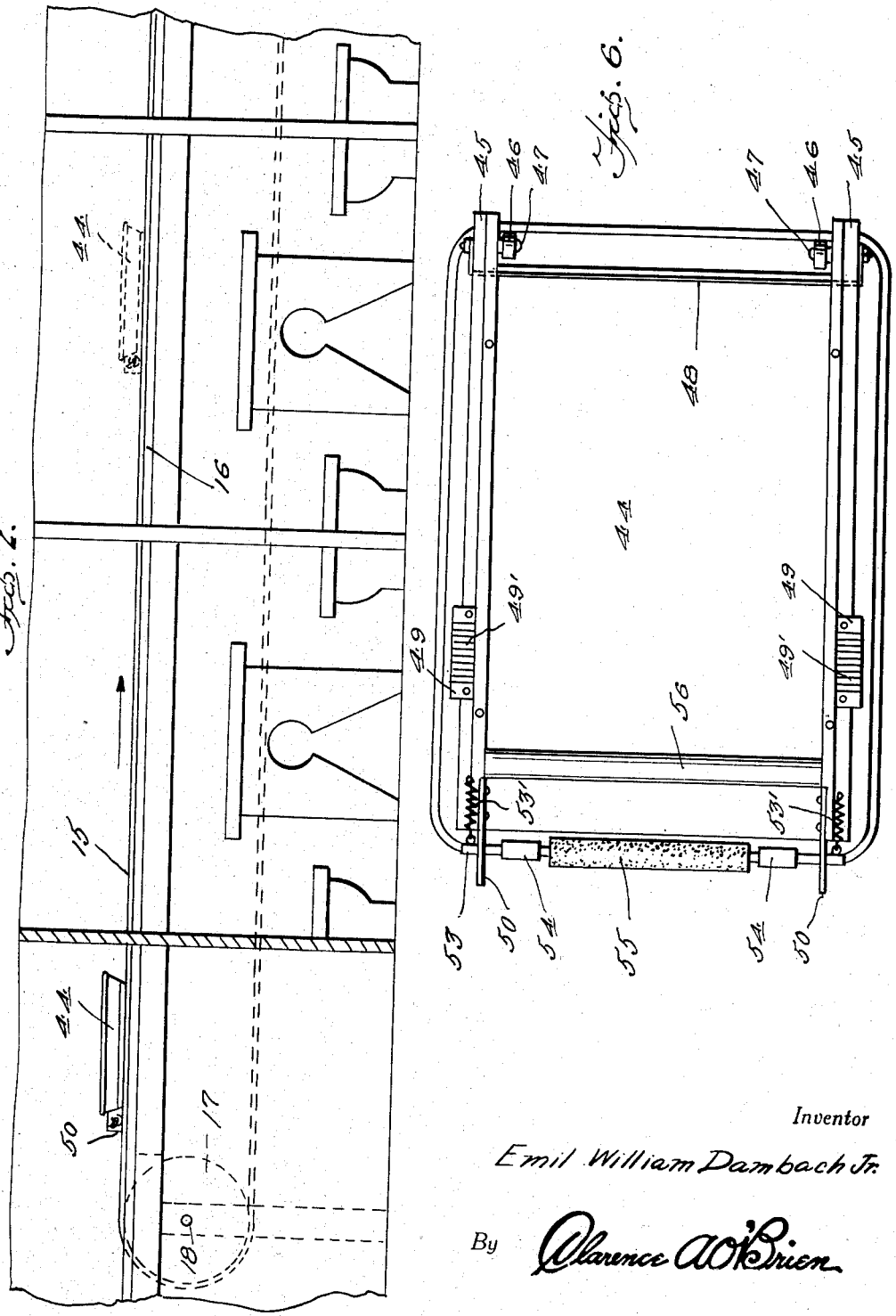
Inventor
Emil William Dambach Jr.
By Clarence A. O'Brien
Attorney

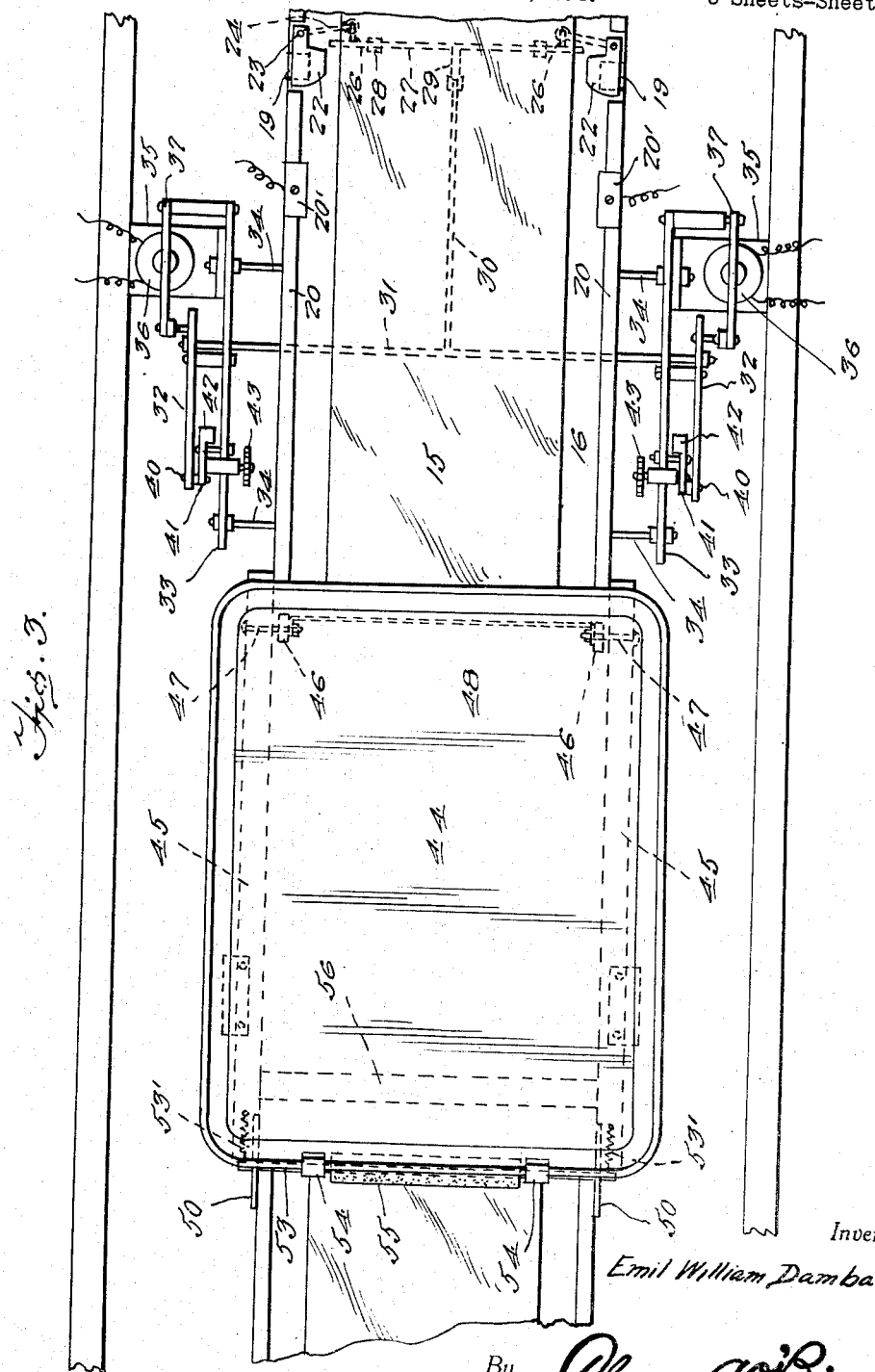

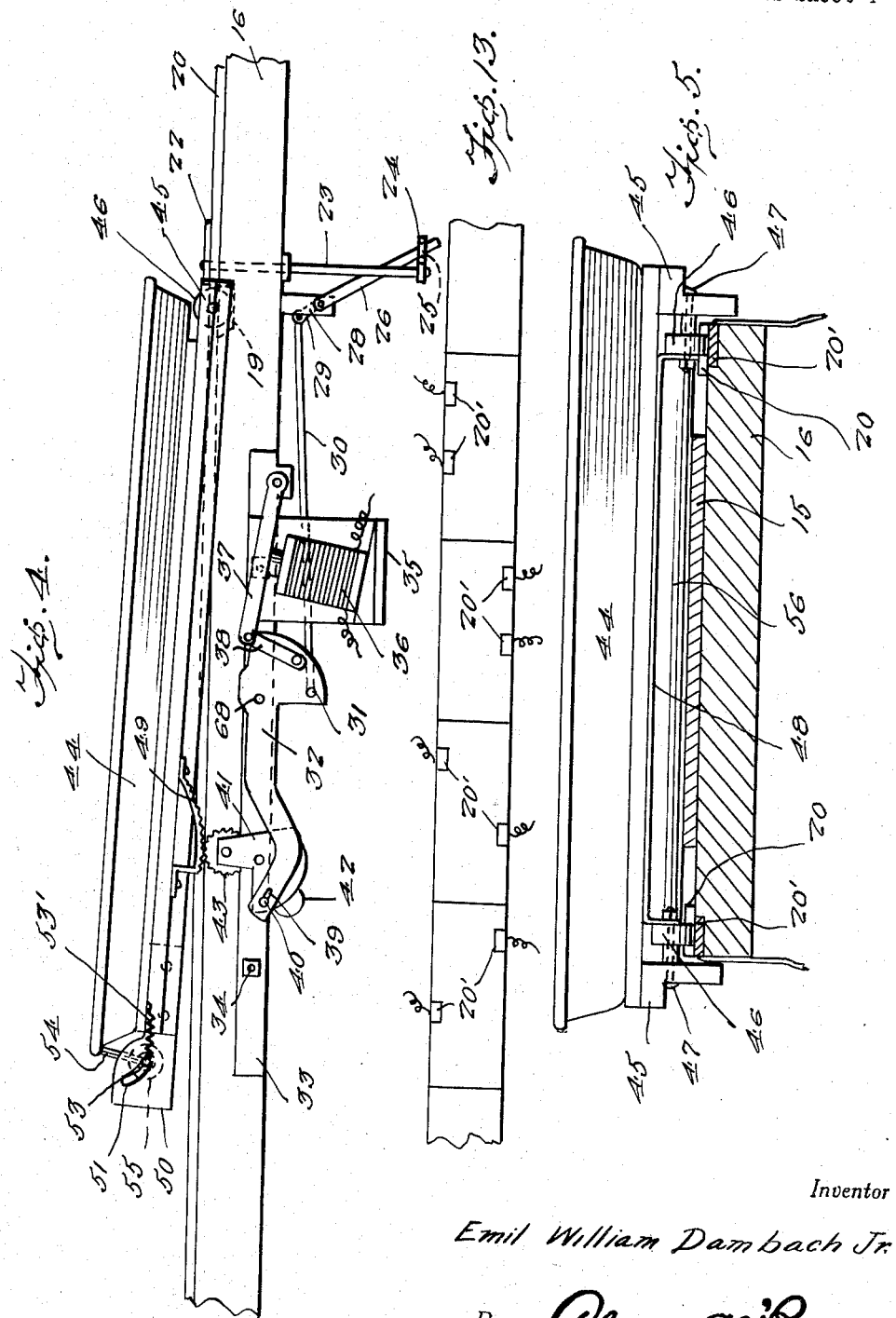

April 21, 1942.
E. W. DAMBACH, JR
2,280,221
SERVING APPARATUS
Filed Nov. 29, 1940
5 Sheets—Sheet 5
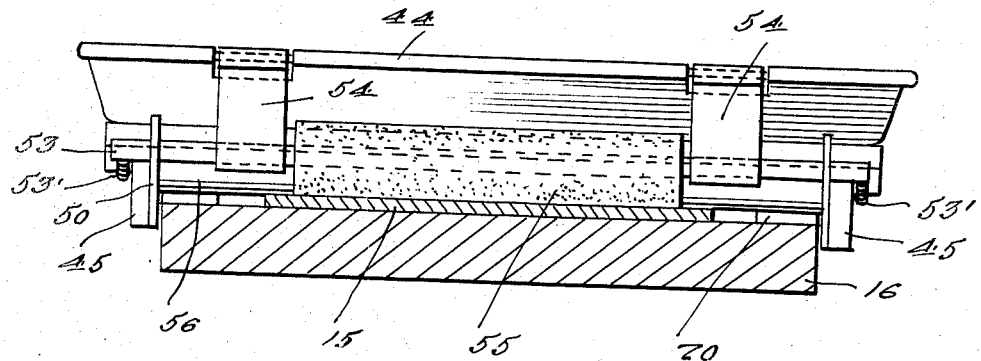
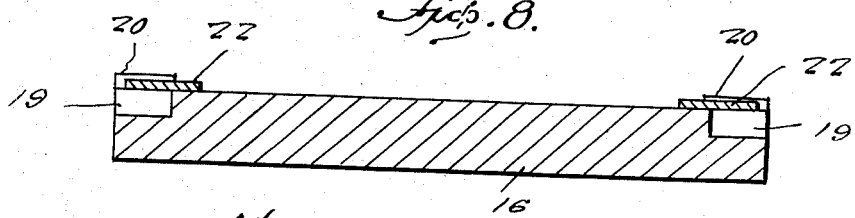
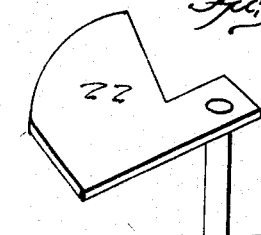
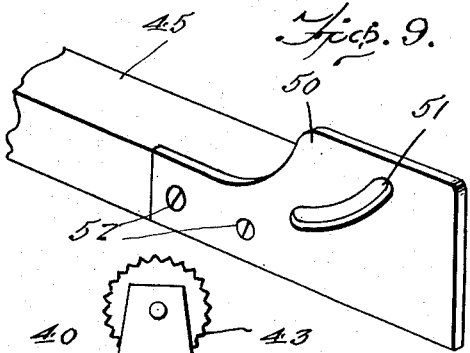
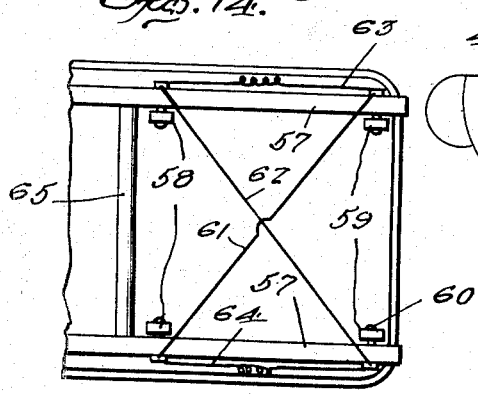
Inventor
Emil William Dambach Jr.
By Clarence A. O'Brien
Attorney Patented Apr. 21, 1942

2,280,221

UNITED STATES PATENT OFFICE 2,280,221

SERVING APPARATUS

Emil William Dambach, Jr., Willow Grove, Pa.

Application November 29, 1940, Serial No. 367,838

5 Claims. (Cl. 186—1)

The present invention relates to new and useful improvements in serving devices and more particularly to a serving apparatus which may be employed in restaurants, hotel dining-rooms and the like, and has for its primary object to provide, in a manner as hereinafter set forth, a device of this character which will greatly simplify the serving of foods.

Another object of the invention is to provide a serving apparatus which will be economical and reliable in use.

Another object of the invention is to minimize the time required to serve a meal in a restaurant or hotel dining-room.

All of the foregoing and still further objects and advantages of the invention will become apparent from a study of the following detailed description, taken in connection with the accompanying drawings, wherein like characters of reference designate corresponding parts throughout the several views, wherein:

Figure 1 is a fragmentary top plan view of a device embodying my invention.

Figure 2 is a fragmentary side elevational view of the invention.

Figure 3 is a fragmentary top plan view of a portion of the conveyer with the tray elevating means shown.

Figure 4 is a side elevational view of the tray in elevated position.

Figure 5 is a transverse sectional view of the conveyer bed with the tray shown in front elevation.

Figure 6 is a bottom plan view of the tray.

Figure 7 is a transverse sectional view of the conveyer bed with the tray shown in rear elevation.

Figure 8 is a transverse sectional view of the conveyer bed.

Figure 9 is an enlarged fragmentary perspective view of one of the tray guide strips.

Figure 10 is a perspective view of one bridge.

Figure 11 is a side elevational view of one of the tray elevating levers.

Figure 12 is a diagrammatic showing of the electrical circuit.

Figure 13 is a fragmentary top plan view of the conveyer bed.

Figure 14 is a fragmentary bottom plan view of a modified form of tray.

Referring now to the drawings in detail, it will be seen that the reference numeral 15 designates a conveyer belt which travels over the bed 16 and is actuated by a pulley 17 mounted on the shaft 18 which is driven by any suitable means.

The conveyer bed 16 is constructed of any suitable material, and is supported beneath the upper flight of the conveyer belt 15. This conveyer bed is of a width greater than that of the conveyer belt 15 and has formed along the side edges thereof and in the top side thereof pockets or notches 19. The conveyer bed 16 is also provided on its top side with tracks 20, also contact plates 20' which are flush with the top surface of the conveyer bed 16 and are located intermediate the longitudinally spaced notches 19.

The notches 19 are normally covered and bridged by bridge plates 22 mounted on the upper end portions of posts 23 which pass through openings in the conveyer bed 16 and extend below the bed 16. Each post 23 is provided with a laterally extending arm 24 which is fixed to each post 23 and has at its outer extremity an opening 25. The arms 24 are swung in a horizontal plane to rotate the posts 23 through the medium of levers 26 fixedly secured to the end portions of a shaft 27 which is supported on the underside of the conveyer bed by means of bearing brackets 28. The rod 27 has an extension 29 thereon which is pivotally connected with a drag link or shaft 30 extending laterally from a tie rod 31.

The tie rod 31 is connected to and between a pair of gooseneck levers 32 which are pivotally secured to and spaced from supporting plates 33. The supporting plates 33 are secured to and spaced from the side edges of the conveyer bed 16 on rods 34, as shown in Figure 3 of the drawings.

Each plate 33 has supported on the outer side thereof and depending therefrom a substantially L-shaped bracket 35 for supporting an electromagnet 36. Also, supported on each plate 33 and spaced therefrom is a pivoted lever 37, which extends over and in close proximity with the magnet 36. Each lever 37 is connected to each gooseneck lever 32 by a link as shown at 38. The forward end of each gooseneck lever 32 has a slotted opening therein as at 39 in which opening pins 40 engage. Each of the pins 40 is fixed to and extends from one side of each tray lifting lever 41 which is pivotally secured to and spaced from one side of each plate 33.

The tray lifting levers 41 are substantially reverse L-shaped and are secured to the plates 33 approximately at their middle portion. The toe of each L-shaped tray lifting lever 41 is weighted as at 42 to normally hold it in disengaged position. Mounted on each of the tray lifting members 41 at the top thereof is a toothed wheel 43.

The serving tray 44 has mounted on its bottom side along the longitudinal edges thereof a pair of angular guide strips 45. The guide strips 45 extend beyond the front edge of the tray 44 and have mounted thereon adjacent their opposed faces a pair of contact rollers 46 which are secured to the guide strips by bolts 47.

The contact rollers 46 are electrically connected by a conductor wire 48. To elevate the tray 44 a pair of substantially wedge-shaped members 49 are secured to the guide strips 45 near one end of the same, and are adapted to engage the toothed wheels 43. The wedge-shaped members 49 are roughened as at 49'. Plates 50 having arcuate slots 51 therein are secured, with screws 52, or by other means, to the rear ends of the guide strips 45, as best shown in Figure 9 of the drawings.

A shaft 53 is attached to the top edge, of the tray 44, at the back end thereof, by swingable links 54, and has its end portions projecting through the arcuate slots 51. This shaft 53 has mounted thereon, intermediate its ends, a rubber sleeve 55. Springs 53' normally hold the shaft 53 in lowered position.

Secured to the underside of the tray 44 adjacent the shaft 53 is a transverse bar 56 which is constructed of rubber or any other suitable material.

The modified form of tray shown in Figure 14 has attached to the bottom side thereof guide strips 57 each of which is provided with a pair of rollers 58 and 59. These rollers are secured to the side strips 67 through the medium of bolts 60. Conductor wires 61, 62, 63 and 64 are connected with the bolts 60 to electrically connect all the rollers. A bar 65, of rubber or other suitable material is secured to the underside of the tray between the guide strips 57 as shown in Figure 14.

The numeral 66 designates a cover plate which is mounted over the tray lifting mechanism.

Figure 13 discloses the manner in which the conductor plates 20' may be located on the conveyer bed 16.

Figure 12 is a diagrammatic illustration of the manner in which the electromagnet 36 is energized to operate the tray lifting mechanism.

The operation of the device is as follows:

When the tray 44 is placed on the conveyer bed 16 to deliver an order to a patron, the tray under the weight of the order causes the sleeve 55 to frictionally engage the conveyer belt 15 and travel therewith. The rollers 46 on the front end of the tray move along the upper surface of the tracks 20 until they contact a predetermined pair of contact plates 20' which are energized by a selected switch 67. Upon contact of the rollers 46 with the plates 20' a complete circuit is created energizing the electromagnet 36 which attracts the arms 37. The downward swing of the arms 37 swings the gooseneck members 32 on their pivots 68 with the result that the link 30 operates the bar 27 and arms 26 to turn the posts 23 and move the bridges 22 to uncover the notches 19 and allow the wheels 46 to drop into the notches 19. Also, the gooseneck arms 32 swing the tray elevating levers 41 into position at which time the wedge members 49 contact and ride on the wheels 43 to elevate the rear end of of the tray 44.

With the rear end of the tray 44 elevated the sleeve 55 is disengaged from the belt 15 thus, the tray is arrested at a predetermined location.

In order that a tray constructed in accordance with the embodiment shown in Figure 14 may have a number of predetermined destinations the contact plates 20' may be positioned in the tray bed 16 as shown in Figure 13 of the drawings.

Although I have shown and described herein a preferred embodiment of my invention, it is to be definitely understood that I do not desire to limit the application of the invention thereto, and any change or changes may be made in the structure and arrangement of the several parts, within the spirit of the invention as claimed.

What is claimed is:

1. In a device of the character described, a conveyer belt, a bed for said belt having notches therein, a tray moved by said belt, means on said bed for disengaging one end of said tray with said belt, and rollers on the other end of said tray engageable in said notches.

2. In a device of the character described, a bed having notches therein, a conveyer moving over said bed, means for bridging said notches, a tray movable by the conveyer on said bed, means for moving said bridges to uncover said notches, and means on said tray engageable in said notches when said bridges are moved to uncovering position.

3. In a device of the character described including a conveyer belt, a bed for said belt having notches therein, a tray moved by said belt, guide members on said tray engageable with the edges of the conveyer belt bed, rollers on said guide members engageable in said notches, and means for elevating and rocking said tray to disengage it from said conveyer belt.

4. In a device of the character described including a conveyer belt, a bed for said belt having notches therein, a tray moved by said belt, guide members on said tray engageable with the edges of the conveyer belt bed, rollers on said guide members engageable in said notches, means for elevating and rocking said tray to disengage it from said conveyer belt, said last-named means including wedge-shaped members on said tray, wheels on said bed, and means for moving said wheels into engagement with said wedge-shaped members.

5. In a device of the character described, a serving apparatus including a conveyer belt, a bed for said belt having notches therein, a tray moved by said belt, guide members on said tray engageable with the edges of the conveyer belt bed, rollers on said guide members engageable in said notches, means for elevating and rocking said tray to disengage it from said conveyer belt, said last-named means including wedge-shaped members on said tray, wheels on said bed, means for moving said wheels into engagement with said wedge-shaped members, and means on said tray and bed for controlling said wheel moving means.

EMIL WILLIAM DAMBACH, Jr.